US006782911B2

(12) United States Patent
DeCapua et al.

(10) Patent No.: US 6,782,911 B2
(45) Date of Patent: Aug. 31, 2004

(54) EASY OPENING FUEL TANK VENT VALVE (75) Inventors: Dennis M. DeCapua, Greenfield, IN (US); Jeffrey E. Devall, Abergavenny (GB)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 10/079,163

(22) Filed: Feb. 19, 2002

(65) Prior Publication Data

US 2002/0112757 A1 Aug. 22, 2002

Related U.S. Application Data (60) Provisional application No. 60/269,443, filed on Feb. 16, 2001.

(51) Int. Cl.[7] .............................................. F16K 24/04
(52) U.S. Cl. .......................... 137/202; 137/43; 251/901
(58) Field of Search .................... 137/43, 202; 251/901

(56) References Cited

U.S. PATENT DOCUMENTS

| | | | | |
|---|---|---|---|---|
| 2,977,972 | A | * 4/1961 | Billeter et al. | ............... 137/202 |
| 4,392,507 | A | 7/1983 | Harris | |
| 4,655,238 | A | 4/1987 | Szlaga | |
| 4,694,847 | A | 9/1987 | Szlaga | |
| 4,735,226 | A | 4/1988 | Szlaga | |
| 4,742,844 | A | 5/1988 | Szlaga | |
| 4,753,262 | A | 6/1988 | Bergsma | |
| 4,760,858 | A | 8/1988 | Szlaga | |
| 4,816,045 | A | 3/1989 | Szlaga et al. | |
| 4,982,757 | A | 1/1991 | Ohasi et al. | |
| 5,028,244 | A | 7/1991 | Szlaga | |
| 5,156,178 | A | 10/1992 | Harris | |
| 5,172,714 | A | * 12/1992 | Kobayashi et al. | .......... 137/202 |
| 5,277,217 | A | * 1/1994 | Kobayashi et al. | .......... 137/202 |
| 5,313,977 | A | 5/1994 | Bergsma et al. | |
| 5,318,069 | A | 6/1994 | Harris | |
| 5,666,989 | A | 9/1997 | Roetker | |
| 5,687,778 | A | 11/1997 | Harris | |

* cited by examiner

Primary Examiner—Gerald A. Michalsky
(74) Attorney, Agent, or Firm—Barnes & Thornburg LLP (57) ABSTRACT A vent valve for use in controlling discharge of fuel vapor from a fuel tank. The vent valve includes a housing for attachment to the fuel tank includes a wall defining a cavity therein. The float is contained in the cavity of the housing and is responsive to the level of liquid in the fuel tank. The level in the fuel tank rises, the float rises within the housing. When the level of liquid in the fuel tank drops, the float moves downwardly in the housing. A passage is provided in the housing which communicates with an external portion of the tank. The vent valve includes at least one vent positioned proximate to and communicating with the passage for providing venting passage of vapor therethrough and to the passage. The vent valve includes a vent assembly having a flexible diaphragm which is displaceably positioned proximate to the passage to control the flow of vapor through the vent and through the passage. The diaphragm is attached to the float making it responsive to the rise and fall of liquid level in the tank. The diaphragm is generally concentrically peeled from a position overlying at least the vent or progressively opening and closing the vent.

34 Claims, 8 Drawing Sheets

EASY OPENING FUEL TANK VENT VALVE

CROSS-REFERENCE TO RELATED APPLICATIONS

This application claims priority under 35 U.S.C. section 119 (e) to U.S. Provisional Application No. 60/269,443, filed Feb. 16, 2001, which is expressly incorporated by reference herein.

BACKGROUND

The present disclosure relates to fuel system valves, and particularly to a flow control valve for regulating the discharge of fuel vapor from a fuel tank. This disclosure also relates to such valves which are tank-mounted for venting fuel vapor from various regions inside a vehicle fuel tank to a vapor-recovery canister or other destination. The disclosure also relates to a tank valve which prevents liquid fuel within a tank venting system from entering and contaminating a vapor-recovery canister within the system.

Is it well understood that significant quantities of fuel vapor can escape from a fuel tank through the filler neck to the atmosphere during the refueling of motor vehicles. Early attempts to control the vapor escape focused upon control devices fitted to a fuel-dispensing pump nozzle connected to a service station fuel pump. Later, control devices mounted directly on-board the vehicle were developed. See, for example, U.S. Pat. No. 4,816,045 to Szlaga et al., relating to a vapor-recovery system mounted on the fuel tank filler neck. Tank venting systems which mount to a fuel tank have also been developed as shown, for example, in U.S. Pat. No. 5,156,178 to Harris.

In additional to controlling vapor escape, well-designed tank venting systems also assist in controlling the amount of liquid fuel which can be pumped into the fuel tank during refueling. For safety reasons, fuel systems are designed so that the fuel tank is never completely filled with liquid fuel. Rather, at least a predetermined portion of the space inside the fuel tank is left for liquid fuel and fuel vapor expansion. Although fuel pump nozzles typically include sensors for shutting off the flow of liquid fuel into the fuel tank when the fuel tank is nearly filled, fuel pump users may manually override the sensors by continuing to pump fuel after the sensors have automatically and temporarily shut the pump nozzle off. To assist in preventing tank overfill under such conditions, a tank venting system is usually provided with a "fill-limit" control system which assists in triggering the nozzle shut-off mechanism when the level of liquid fuel in the fuel tank has risen to a predetermined level. See, for example, the fill-limit control system disclosed in U.S. Pat. No. 4,816,045 to Szlaga et al.

Also, it has been recognized that fuel vapor is generated in the fuel tank during operation of the vehicle, for example, by evaporation or by sloshing of the liquid fuel against the walls of the tank. Pressure can build up in the fuel tank as a result of the newly formed fuel vapor unless control devices are provided to vent the fuel vapor from the fuel tank during vehicle operation. Such valves have been referred to as "run-loss" valves, vent valves and tank venting rollover valves because they handle the fuel vapor loss during vehicle run and are capable of preventing liquid fuel carry-over during vehicle rollover.

Vehicle fuel systems are known to include pressure-relief valves mountable on either fuel tanks or filler necks. In general, the venting portion of these conventional valve assemblies has included a pressure-relief valve positioned in a vent passageway having a surface exposed to the pressure in the tank and a yieldable control spring urging the pressure-relief valve normally to close the vent passageway. In response to a predetermined superatmospheric pressure, the pressure-relief valve is urged in opposition to the control spring to open the vent passageway.

Examples of valves and systems as discussed above include U.S. Pat. Nos. 5,687,778 to Harris; 5,666,989 to Roetker; 4,760,858 to Szlaga and 4,742,844 to Szlaga.

A problem arises with prior devices when the dimension between a full tank fuel level and the inside surface of the tank must be minimized. Prior devices do not provide for venting below the float thereby increasing the distance between the full tank fuel level and the top inside surface of the tank. This situation is exacerbated when the venting valve must be mounted inside the tank. Another problem arises with the prior art when the valves are required to reopen against tank pressure. Such pressure tends to hold the valve in a closed position preventing desirable venting.

Another problem that arises with prior vent designs is that some liquid fuel may flow through the vapor path. In other words, while a passage is provided for venting of the fuel vapor, a portion of liquid may be entrained with the vapor and flow through the vapor path or liquid fuel may splash or slosh into the vapor path.

SUMMARY

Disclosed is a vent valve for mounting inside a tank. The valve also facilitates mounting inside the tank to minimize the dimension between a full tank level and a top inside surface of the tank when the valve closes. This is a "short shut-off" condition. Internal venting is provided below the float, through bottom exits, allowing smaller dimensions between the full tank fuel level and top inside surface of the tank.

The disclosure provides a vent valve which also allows the valve to reopen against tank pressures which might otherwise tend to hold the valve shut. This is achieved by employing primary and secondary sealing structures and employing, at least in part, a float weight which least initiates displacement of the primary seal relative to a sealing surface. The disclosure also prevents liquid flow through the vapor path. In the various embodiments disclosed herein a flow channel is provided in the vent valve to create a tortuous path for vapor and liquid to flow. Generally, liquid is removed from the vapor flow and liquid is prevented from splashing or sloshing into the vapor path.

BRIEF DESCRIPTION OF THE DRAWINGS

The detailed description particularly referring to the accompanying figures in which.

DETAILED DESCRIPTION

While the present disclosure may be susceptible to embodiment in different forms, there is shown in the drawings, and herein will be described in detail, embodiments with the understanding that the present disclosure is to be considered an exemplification of the principles of the disclosure and is not intended to limit the disclosure to the details of construction and the arrangements of components set forth in the following description or illustrated in the drawings.

Figure 1:
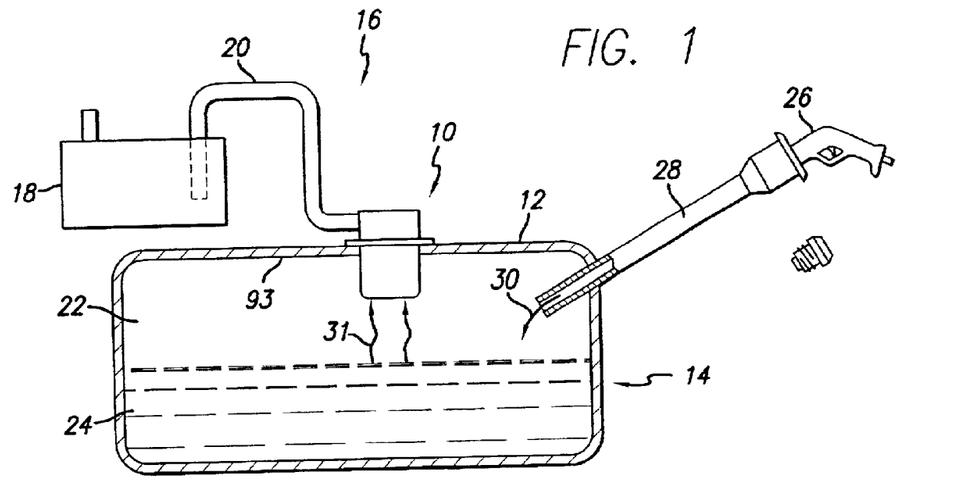
FIG. 1 is a diagrammatic sectional view of a tank provided with a filler neck and a tank venting system including the fuel tank vent control valve disclosed, the valve is coupled by a conduit to a vapor-recovery canister mounted on-board the vehicle.

As shown in FIG. 1, a fuel tank vent control valve 10 is mounted on a wall 12 of a fuel tank 14. The fuel tank valve 10 is part of a tank venting system 16 which also includes a vapor recovery canister 18 connected to the tank vent control valve by conduit 20. Vapor which accumulates in a vapor space 22 of a portion of liquid fuel 24 within tank 14 is conducted through the tank vent control valve 10 through the conduit 20 to the vapor-recovery canister 18. Also, during a refueling operation in which a filler nozzle 26 is inserted into a filler neck 28 to deliver liquid fuel 30 to the tank 14, vapor 31 is vented through valve 10 and conducted through tank venting system 16 to prevent escape to the ambient environment.

The valve 10 as disclosed herein is shown in FIG. 1 as being mounted through a hole in the tank wall 12. It should be noted that the valve shown in FIGS. 2–14 can be mounted to the tank 14 in many different ways including completely internally shown in FIG. 14. It should be noted, however, that the embodiment as shown in FIGS. 2–13 will likely have some component extending through the wall 14 to connect to the conduit 20 to carry vapors from the tank 14 to the canister 18.

Figure 2:
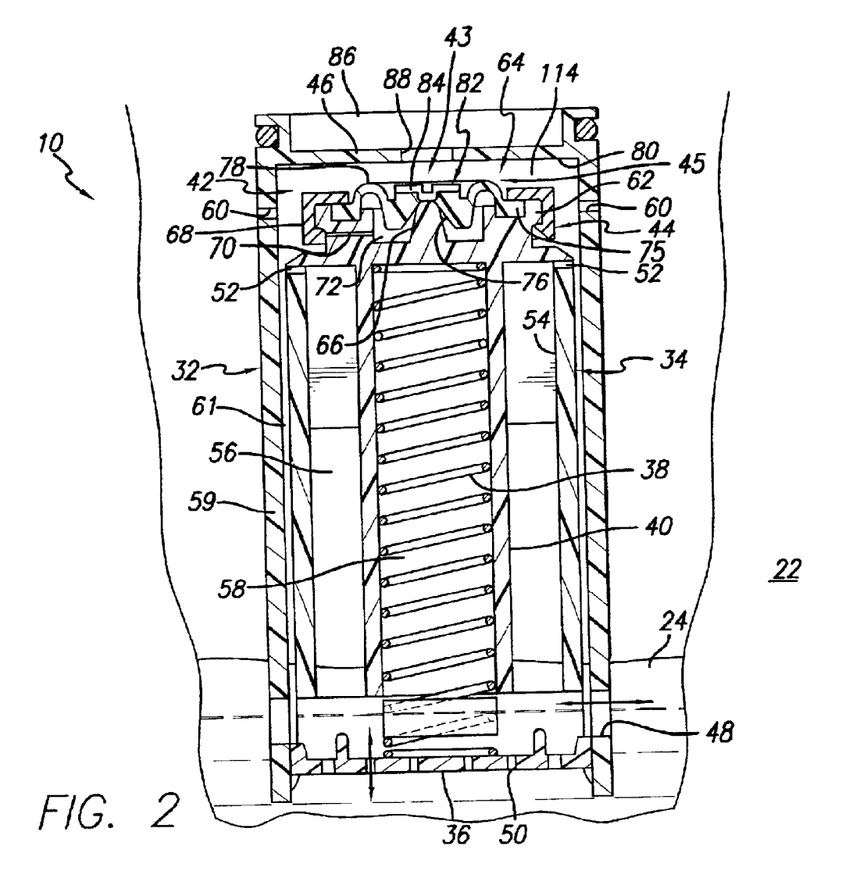
FIG. 2 is an enlarged sectional view of an embodiment of the valve.

The tank vent control valve 10 and various embodiments is shown in greater detail in the sectional and enlarged views of FIGS. 2–14. FIG. 2 provides an enlarged sectional view of the valve 10. Valve 10 includes housing 32 in which is contained a float 34. A foraminous base 36 is attached to a lower, open end of the housing 32. A spring 38 is retained within a hollow shaft 40 of the float 34 to provide controlled buoyancy of the float 34. A valve assembly 42 is provided on an upper portion 44 of float 34 and a corresponding top 46 of housing 32.

As shown in FIG. 2, liquid fuel 24 surrounds the housing 32 and enters the housing through lower ports 48 in the housing 32 and openings 50 in the foraminous base 36. Float 34 is sized and dimensioned in combination with characteristics of spring 38, in accordance with the well known teachings in the vent valve art, so as to provide controllable buoyant movement of float 34 within housing 32. Vents 52 are provided through walls 54 of float 34 to help evacuate a chamber 56 defined between an inside surface of wall 54 and an outside surface of shaft 40. A compartment 58 defined by the hollow shaft 40 provides an additional buoyancy component to the float 34.

Movement of float 34 upwardly and downwardly within housing 32 is relatively unaffected by wave action, sloshing or generally side-to-side movement of liquid fuel 24 in tank 14. In this regard, a wall 59 of housing 32 defining a cavity 61 in which float 34 is retained, shields the float 34 against wave action within tank 14. Upper vents 60 allow vapor within housing 32 and external to float 34 to pass from the housing 32. Upper vents 60 are provided in a generally smaller diameter so as to minimize the passage of liquid fluid there through which might otherwise effect operation of float 34. Generally, valve assembly 42 on upper portion 44 of float 34 further shield components of the valve assembly 42 from liquid fuel which might pass through vents 60.

Figure 3:
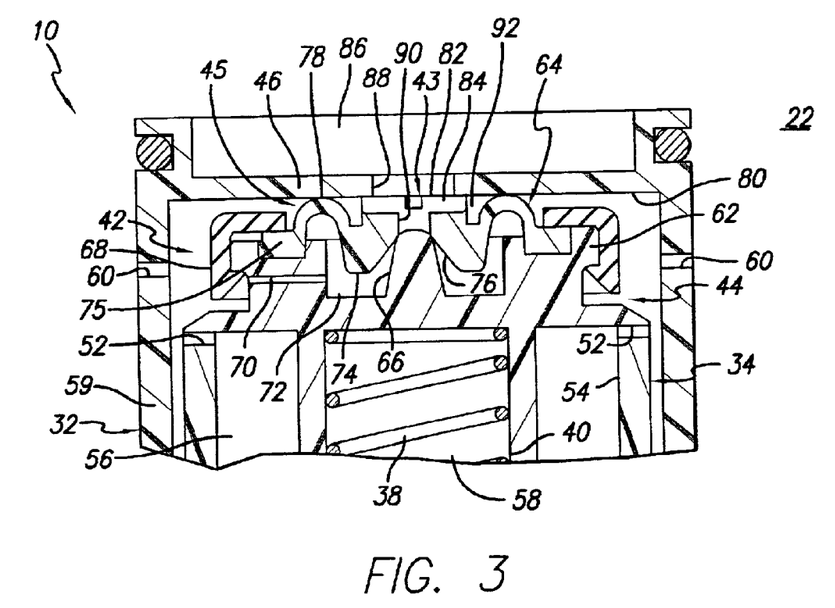
FIG. 3 is an enlarged, partial fragmentary, sectional view of an upper portion of the valve as shown in FIG. 2 in which at least a portion of a diaphragm abuts a surface of a valve housing to seal a passage connected to a vapor-recovery canister as shown in FIG. 1.
Figure 4:
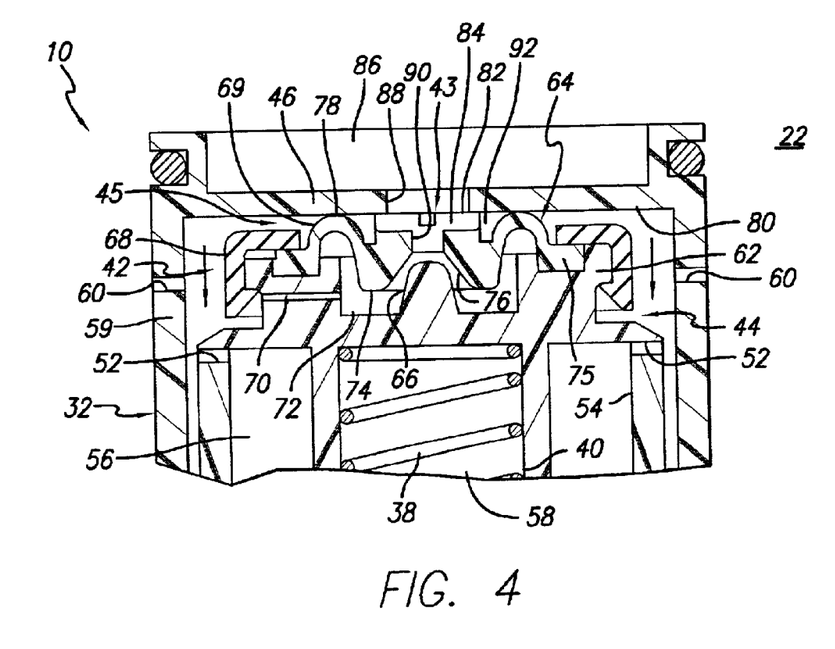
FIG. 4 is a progressive view of the valve as shown in FIG. 3 showing opening of or primary sealing structure in the form of a nipple which has been disengaged from a corresponding seat as a result in a drop in the fuel level within the tank and the corresponding drop of the float within the valve.

FIGS. 3 and 4 show progressive views of valve assembly 42 in operation. In this regard, the enlargements as shown in FIG. 3 and 4 provide clear illustrations of components comprising valve assembly 34 and a base 62 is provided on an upper portion of float 34. The valve assembly 42 includes at least a primary sealing structure 43 and a secondary sealing structure 45. The primary and secondary sealing structures 43, 45 are provided in this embodiment in the form of a flexible generally annular diaphragm 64 attached to the float 34 and a protrusion 66 generally extending from the float 34. The flexible diaphragm 64 is attached to the float 34. At least a portion of the flexible diaphragm 64 is positioned over the protrusion or nipple 66 which also extends from float 34. A connector 68 in the form of an annular clip ring retains diaphragm 64 on base 62. The diaphragm 64 has a first side 69, a portion of which abuts an inside surface 80 of the housing top portion 46. A bore 70 extends through base 62 to provide communication with a gap or cavity 72 formed between the base 62 and a second side 74 of diaphragm 64. The passage 70 could also extend through all or a portion of the diaphragm 64 in an alternate embodiment of the value and achieve the same function as the passage 70 disclosed.

The diaphragm 64 is a generally annular structure which is positioned generally concentric with a passage 88. An outer annular edge 75 of the diaphragm 64 is attached to the float 34. As further described herein, the diaphragm provides a seal at least around a perimeter of the passage 88 and is generally peeled away from the passage when the float 34 is moved away from the passage 88. The peeling starts at the outer perimeter or contact area of the diaphragm and moves radially inwardly, generally concentrically toward the center of the passage and diaphragm. In other words, the diaphragm does not peel away from one side or edge of the passage but instead peels all around the outer most contact area and progressively moves inwardly generally concentrically toward the center of the diaphragm and passage.

The line of action of the sealing and peeling force of the diaphragm against the sealing surface is generally perpendicular to the normal direction of the float weight. In other words, the float weight is normally directed downwardly in the housing and movement of the float is responsive to the level of fuel in the tank. As the weight of the float pulls down on the diaphragm, the peeling generally occurs at a right angle to the downward force. This helps to reduce the force required to disengage the seal from the sealing surface.

In a closed position (see, FIG. 3), in which float 34 is moved upwardly on rising fuel 24, nipple 66 engages a correspondingly formed and positioned seat 76 in diaphragm 64. The diaphragm 64 is a generally circular shape being positioned generally concentric relative to the passage 88. The flexible diaphragm 64 is formed as a convoluted structure having extending annular portion 78 of diaphragm 64 extending upwardly toward the passage 88. The extending portions 78 form an annular seal against the corresponding surface 80 of top portion 46. A central portion 82 of diaphragm 64 is formed with channels 84 defining vents communicating with the passage 88 when the diaphragm 64 is positioned proximate to the passage 88 and which provides venting between an upper cavity 86 of housing 32 by way of top passage 88.

With reference to FIG. 4, as the level of fuel 24 lowers within tank 14 the weight of float 34, from which nipple 66 protrudes, pulls nipple 66 downwardly to eventually disengage it from seat 76. Generally, the engagement pressure of nipple 66 in seat 76 depends on the level of fuel in tank 14. This is because gap 72 surrounding nipple 66 is vented to the tank by way of bore 70. Venting through bore 70 equalizes the pressure on the second side 74 of the diaphragm 64 to prevent unequal pressure from holding the diaphragm 64 closed.

Figure 5:
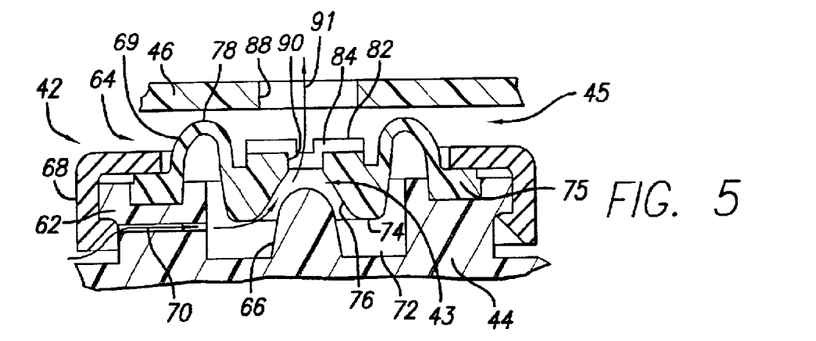
FIG. 5 is an enlarged progressive view of the valve as shown in FIG. 4 showing opening of a secondary seal in the form of an annular protrusion of the diaphragm against the surface of the housing which has been disengaged from the surface.

As shown in FIG. 5, continued downward movement of float 34 results in complete disengagement of nipple 66 from seat 76 thereby opening aperture 90 formed in the central section 82. Complete disengagement of nipple 66 from seat 76 allows movement of vapor 91 from tank 14 through passage 70 to cavity 72, through aperture 90 to passage 88 and into upper cavity 86. The pressure inside the tank equalizes through the bore 70, gap 72, aperture 90, and passage 88 which are all in communication when the nipple is disengaged from the seat 76.

Also, as float 34 drops it pulls on diaphragm 64 which is attached to base 62. Pulling on the diaphragm 64 causes disengagement or movement of the extending portion 78 forming an annular seal against surface 80. The disengagement or peeling described above occurs progressively starting from the outside and moving generally concentrically inward. Disengagement of the extending portions of 78 of diaphragm 64 is also promoted by equalization caused by disengagement of nipple 60 from seat 76. Even if downward pulling on diaphragm 64 causes central portion 82 to rise upwardly to abut surface 80, channels 84 help to equalize pressure within an annular void 92 internally of the extending portion 78.

During a refilling operation, float 34 rides on the fuel 24 dispensed into the tank 14 to a point whereby the extending portions of diaphragm 64 abut surface 80. Continued filling ultimately causes nipple 66 riding on top of float 34 to engage seat 76 thereby closing passage of vapor through aperture 90. A pressure bubble develops within vapor space 22 of tank 14 providing feedback to the filler nozzle 26 and a sensor of known construction (not shown) thereon which senses the increased level of fuel 24. Sensing the increased level of fuel provides a shutoff mechanism for the fuel dispensing mechanism.

In a rollover condition in which the vehicle is at least partially or substantially inverted, the diaphragm 64 mates against surface 78 with nipple 66 engaging seat 76 to prevent leakage of fuel 24 from tank 14 into tank venting system 16. This rollover feature and function in a rollover condition helps increase the safety associated with the use of the present tank venting system 16 and tank 14.

It should be noted that the valve 10 facilitates mounting of tank vent control valves 10 within tank 14. The configuration and structure of the valve 10 helps to minimize the dimension of the vapor space 22 defined between the fuel level and an opposed top inside surface 93 of tank 14. This minimizes the empty space defining vapor space 22 and maximizes the quantity of fuel 24 within tank 14 while maintaining the shutoff and rollover features of the control valve 10. Further, the valve prevents liquid flow through the vapor path as described herein and above.

Figure 6:
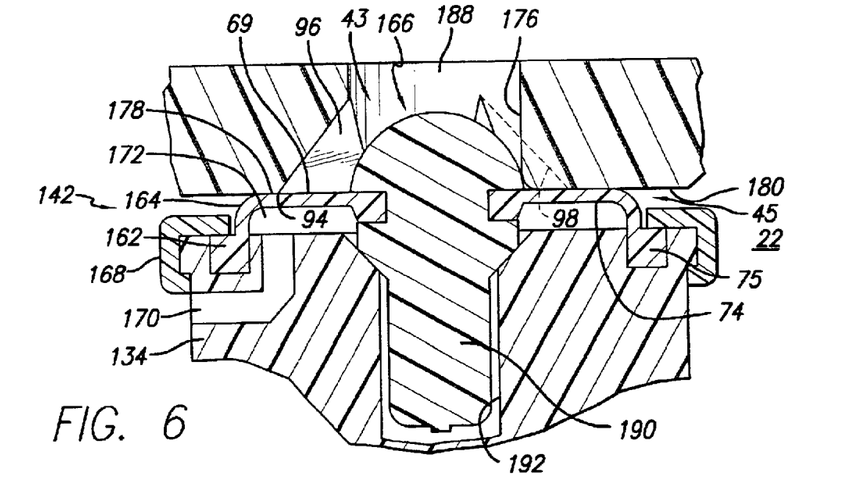
FIG. 6 is a second embodiment of the valve employing a nipple engaging a passage and diaphragm engaging a surface similar to that as shown in FIGS. 2–5.

FIGS. 6–9 show another embodiment of the valve which included a valve assembly 142. As shown in FIG. 6, a diaphragm 164 abuts a surface 180 to seal a passage 188. Similar to the embodiment as shown in FIGS. 2–5, and a radial seal is formed by an annular area of diaphragm 164 against surface 180 proximate to an edge 94 of top passage 188. Diaphragm 164 is attached to an upper portion of float 134 by retainer 168 against base 162. Passage 170 is provided to communicate between cavity 172 and vapor space 22.

As shown in FIGS. 6–9, valve assembly 142 is carried on housing 32 as similarly shown in FIGS. 2–5. As such, only the valve assembly 142 is focused on in the enlarged sectional views of FIGS. 6–8 with the understanding that the other structures are substantially similar or identical to those as described with reference to FIGS. 2–5.

Figure 7:
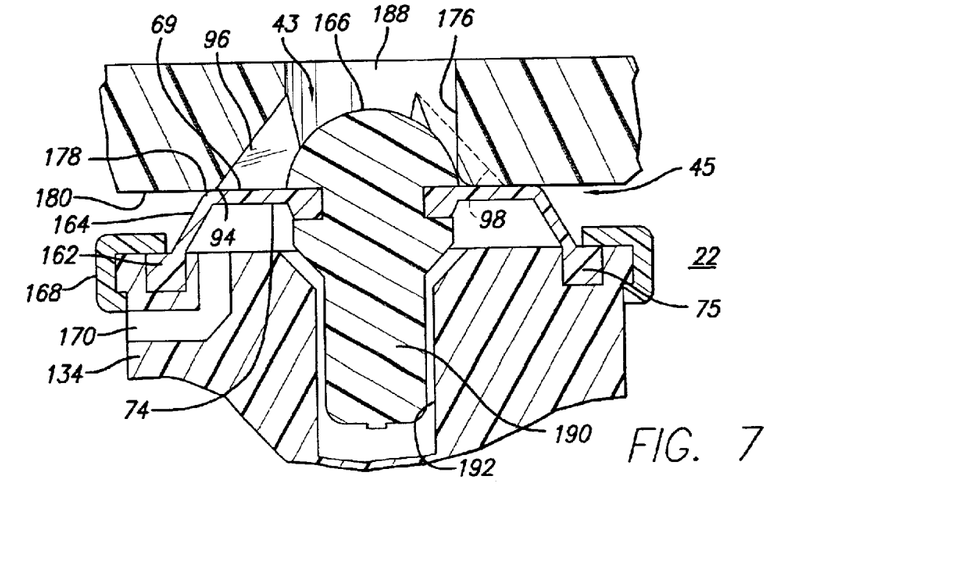
FIG. 7 is a progressive view of the embodiment as shown in FIG. 6 in which the float has been downwardly displaced causing the weight of the float to pull downwardly on the diaphragm and initiate disengaging the diaphragm from the surface.

As shown in FIG. 6, a protrusion or nipple 166 extends from the first side engaged in a corresponding seat 176. As shown in FIG. 7, downward movement of float 134 causes a peeling of diaphragm 164 away from surf 180. Vents 96 are generally triangular by shaped and extend generally radially outwardly away from a perimeter edge 94 or passage 188. The vent 96 are shown as tapering from the passage 188 towards the surface 180 and from the edge 94 radially away from the edge 94. This embodiment shows tapering in two directions as noted above, but is envisioned that such tapering may occur in only one of the directions and not the other.

Figure 8:
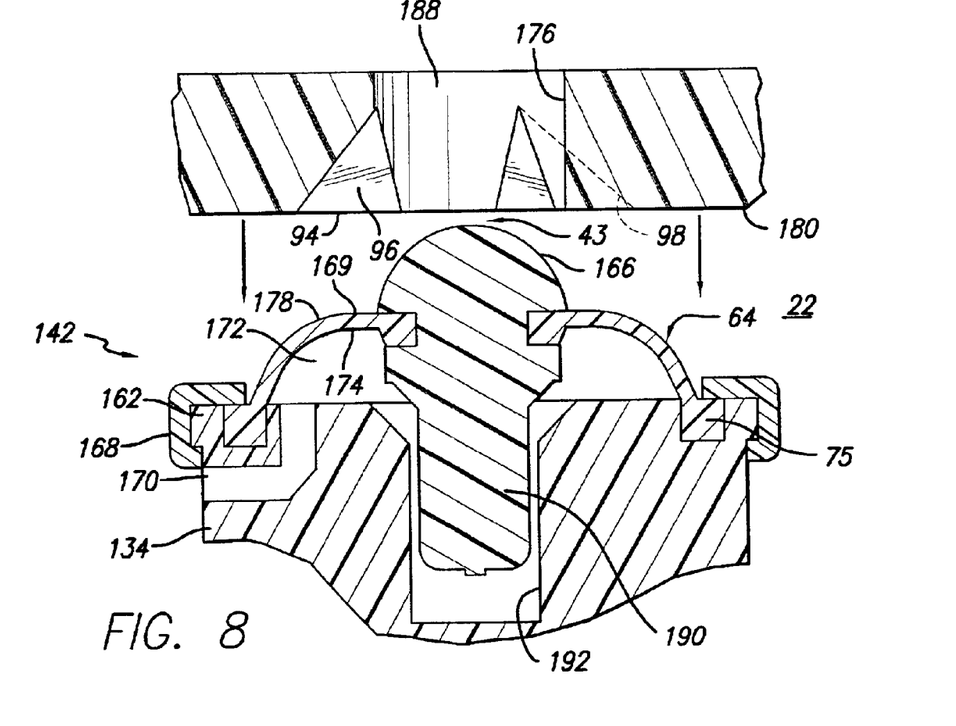
FIG. 8 is a progressive view of the embodiment as shown in FIGS. 6 and 7 in which the diaphragm has been disengaged from the surface and the nipple becomes disengaged from a corresponding passage.
Figure 9:
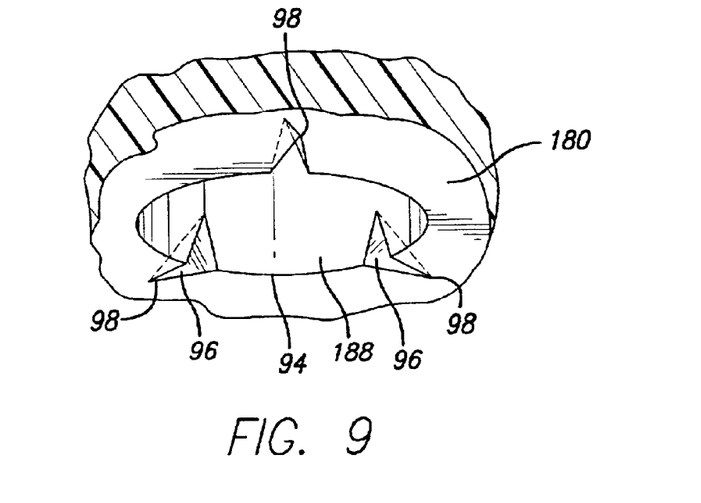
FIG. 9 is a partial fragmentary bottom perspective view of the surface and the corresponding vents provided thereon.

As peeling of diaphragm 164 away from surface 180 progresses, a portion of diaphragm 164 encounters a leading edge 98 of each vent 96. When diaphragm 164 is peeled away from leading edge 98 it allows for progressive equalization of pressures within vapor space 22 and passage 188. Ultimately, nipple 166 disengages seat 176 facilitating free movement of vapor from vapor space 22 through top passage 188. Operation of the passage of vapor from vapor space 22 through valve 10 into system 16 is consistent with that as described herein and above in relation to FIGS. 2–5.

As shown in FIGS. 6–8, a guide protrusion 190 extends downwardly from the second side 74 of the diaphragm 164. A guide recess 192 is provided in the float 134, generally positioned for alignment with and receiving of the guide protrusion 190. The guide protrusion 190 engaging the guide recess 192 relative movement therein upon displacement of the diaphragm 164 relative to the passage 188. The guide protrusion and recess 190, 192 help maintain alignment of and positioning of the protrusion 166 in the passage 188. Also, the guide protrusion and recess 190, 192 help provide consistent circumferential displacement of the flexible diaphragm 164 relative to the vents 96. In other words, the protrusion and recess 190, 192 prevents one of the vents 96 from being completely open when the other vents are not opened. This provides controlled progressive equalization of pressures within the vapor space 22 and passage 188.

As described above, the guide protrusion and recess 192 help to guide the movement of the diaphragm 164 relative to the sealing surface 180. It should also be noted, however, that the nipple or protrusion 166 also helps to center the alignment of the diaphragm 164 onto sealing surface 180. In this regard, the protrusion 166 engages the corresponding aperture 188. As the extending surface of the protrusion 166 encounters the edge 94 of the passage 188, it tends to cause alignment and engagement of the protrusion 166 in the passage 188. As such, the protrusion provides aligning features.

Turning now to the embodiments as shown in FIGS. 10–14, similar peeling actions of a flexible diaphragm 264 in relation to vents 296 which communicate with a passage 288 are similar to those shown in the preceding embodiments. Float 234 is carried in housing 232 and includes spring 238. Ports 248 allow for passage of fuel 24 into housing 232 to effect movement of float 234 therein. Float 234 helps to shield vents 296 against passage of fuel 24 which might enter housing 232. As shown in FIGS. 2–5 and 6–8 the first side 269 and the second side 274 of diaphragm 264 communicate with vapor space 22 in tank 14. Axial passage 270 communicates with cavity 272 generally defined by a portion of shaft 240, diaphragm 264 and float 234.

Figure 10:
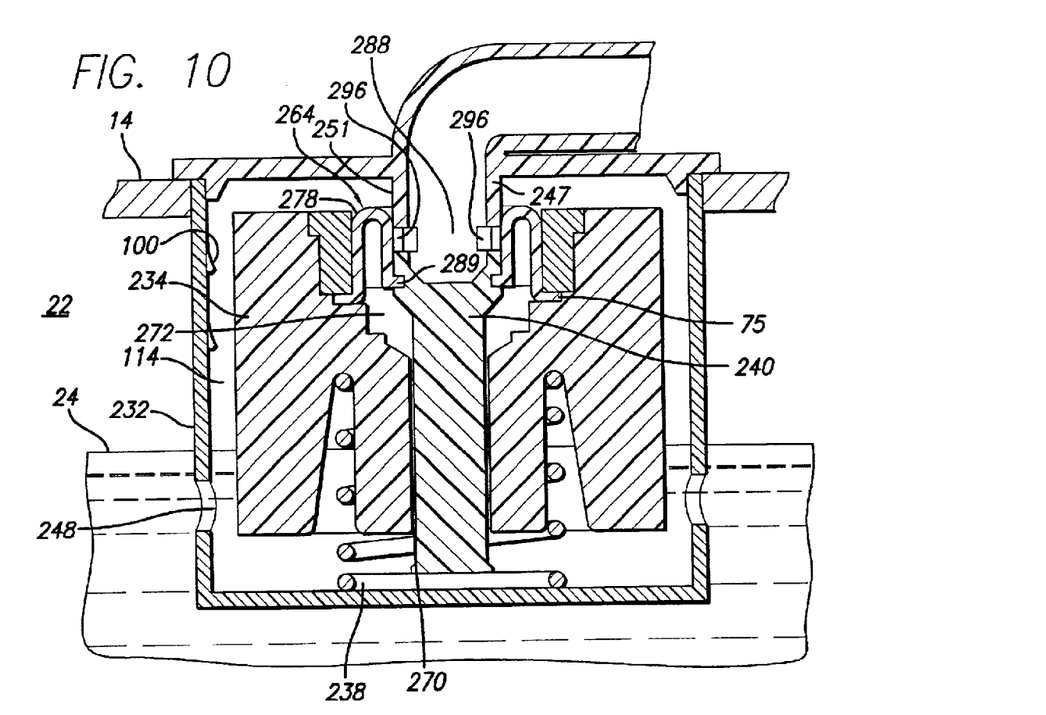
FIG. 10 is a third embodiment of the valve employing a flexible diaphragm which controllably covers and opens radially disposed vents.
Figure 11:
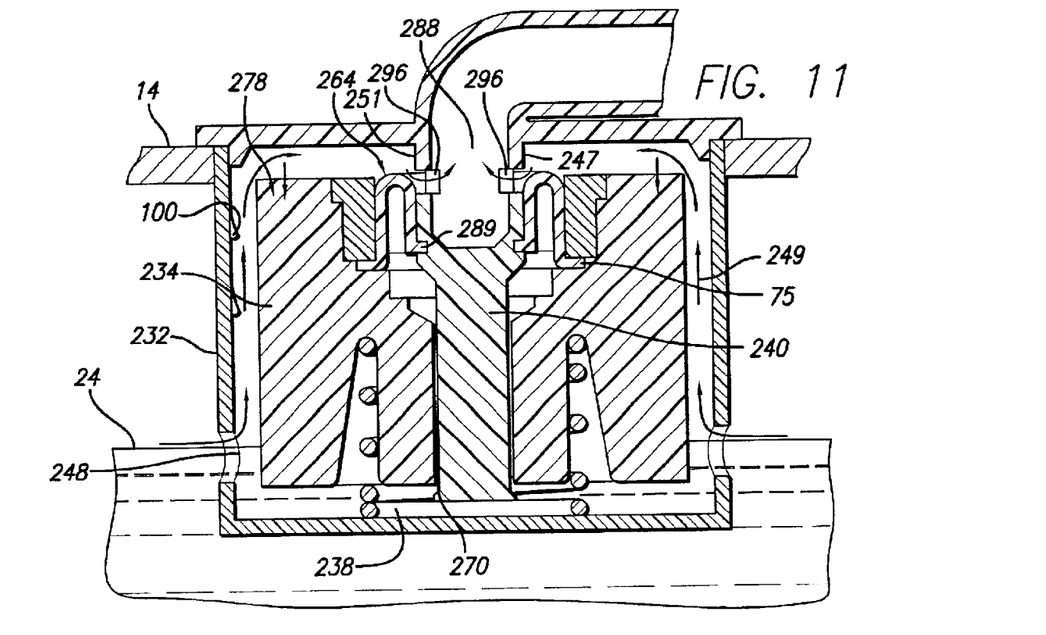
FIG. 11 is a progressive view in which the level of the fuel in the fuel tank has dropped thereby causing a portion of the diaphragm to peel-away from the corresponding vents to allow venting of vapors therethrough.

Downward movement of float 234 facilitates peeling of diaphragm 264 along the outside surface 251 and away from the radially disposed vents 296. Progressive peeling of diaphragm 264 away from vents 296 promotes equalization of vapor within housing 232 to pass through vents 296 into hollow passage 288 defined by generally tubular wall 247. Internal surfaces between housing 232 and float 234 define a tortuous path 249 through which vapor must travel before reaching vents 296. This path 249 facilitates condensation or agglomeration of liquid 100 which might be carried by the fuel vapor. This helps reduce the accumulation of liquid in passage 288.

The peeling of the diaphragm 264 away from the surface 251 corresponds to the same action as described with reference to FIGS. 2–9. The diaphragm 264 is a circular structure with an inner edge. Movement of the float 234 away from the passage 288 causes peeling of the outer most portion from the surface 251. As the float continues to drop the peeling continues, as in the embodiments above, generally radially inwardly toward the inner edge 289.

Figure 12:
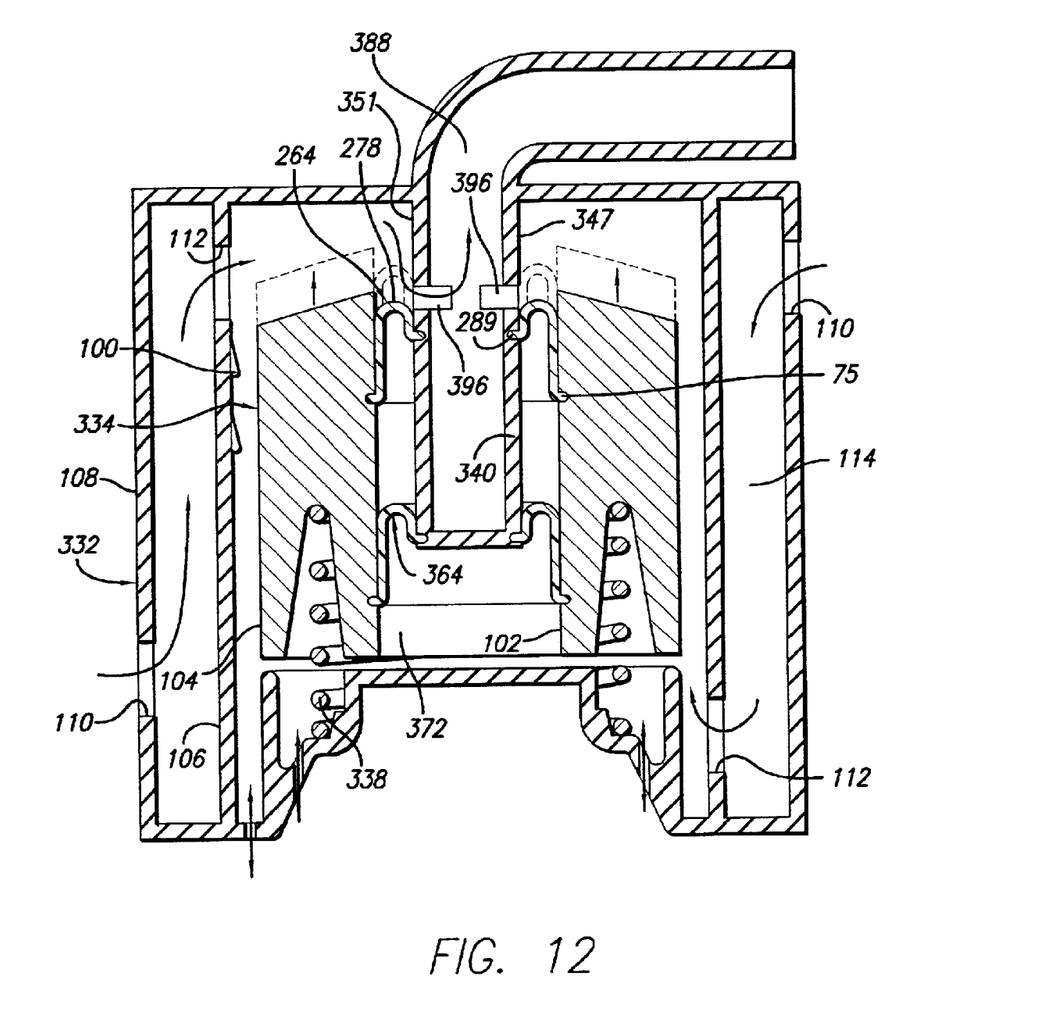
FIG. 12 is a fourth embodiment of the valve which is substantially similar to the embodiment as shown in FIGS. 10 and 11.
Figure 13:
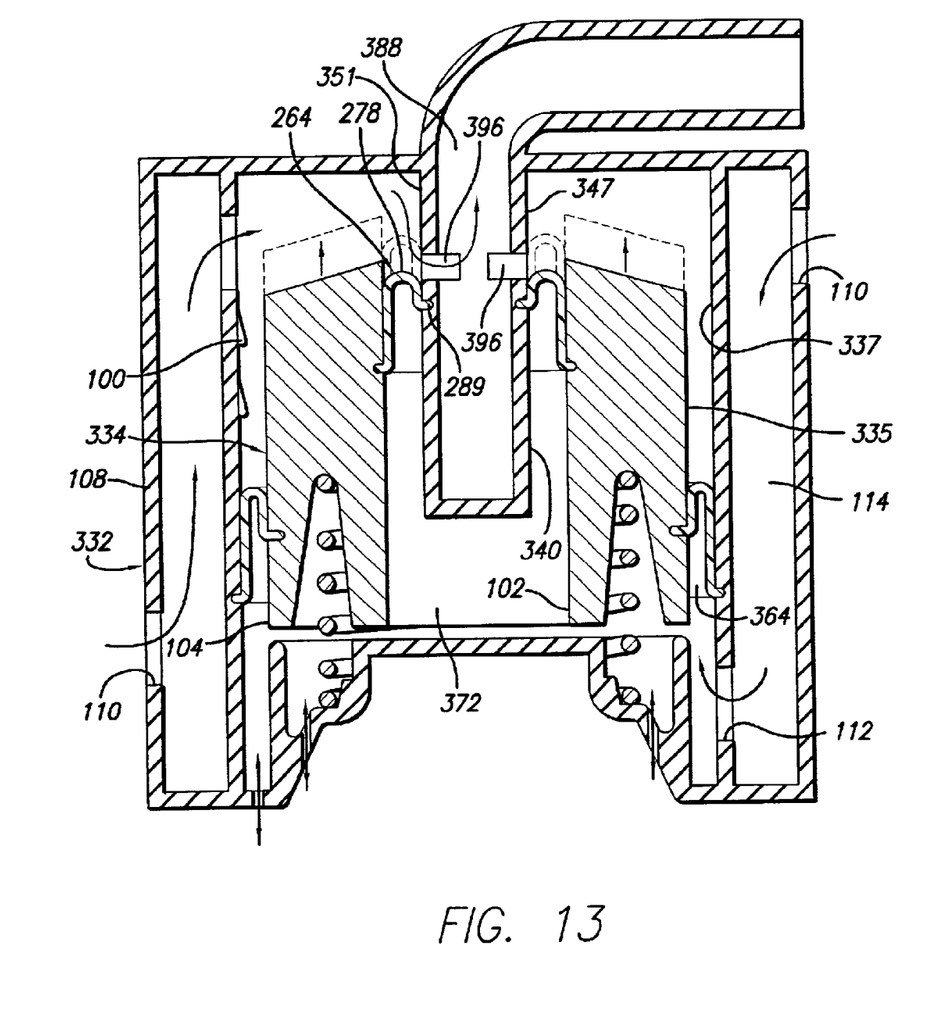
FIG. 13 is an embodiment similar to that shown in FIG. 12 and in which seals are located externally of the float rather than internally of the float as shown in FIG. 12.

With regard to FIGS. 12 and 13, a pair of diaphragms including a vent covering diaphragm 264 performing substantially the same function as shown in FIGS. 10 and 11 and a second diaphragm 364 positioned outwardly of the float 334. Operation of float 334 is shown in FIGS. 12 and 13 is substantially identical to that as shown in the preceding figures and described herein. Also, FIG. 12 positions the second diaphragm 364 between an inside shaft 340 and an inside surface 102 of float 334. In contrast, embodiment as shown in FIG. 13 positions the second diaphragm 364 between an outside surface 104 and an inside surface of a secondary wall 106 of housing 332. In both embodiments, in FIG. 12 and in FIG. 13, the second diaphragm 364 facilitates generally frictionless guidance of float 334 in housing 332.

The second diaphragm 364 as shown in FIGS. 12 and 13 help to facilitate generally frictionless, or at least reduce friction, guidance of the float 334 as it travels in the housing. In this regard, the second diaphragm 364 helps to further reduce canting or tilting of the float 334 as it travels upwardly and downwardly without adding significantly to the friction associated with the movement. The embodiment shown in FIG. 13, the placement of the second diaphragm 364 against an outside portion 335 above the float 334 helps to further balance the position and movement of the float relative to the housing.

As shown in both FIGS. 12 and 13, housing 332 includes an external wall 108 and an internal wall 106. External passages 110 in external wall 108 and internal passages 112 through internal wall 106 define a tortuous path through which vapor must flow to reach vents 396. The external wall 108 and internal wall 106 define a channel 114 which in effect becomes a tube or tortuous path which facilitates separation of liquid from vapor flow. Additionally, the channel 114 and housing 332 shield float 334 from adverse effects of moving fuel yet allow fuel to enter the housing 332. By allowing fuel to enter the housing 332 it can act on float 334 to seal and reveal vents 396 by peeling or reapplying diaphragm 264 thereto as described therein and above.

Figure 14:
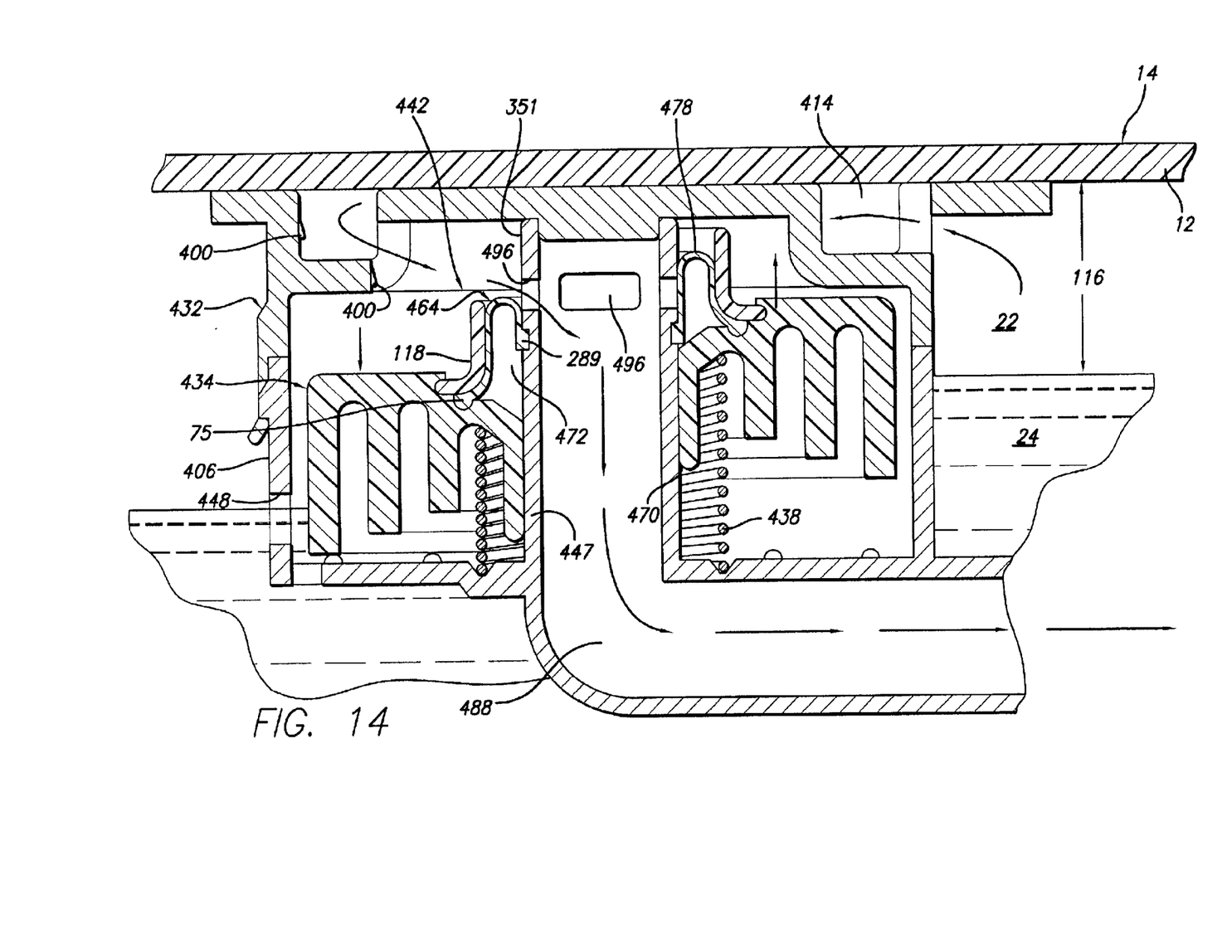
FIG. 14 is a side-by-side progressive view of a fifth embodiment of the valve which provides a flow channel facilitating a tortuous path to remove liquid from the vapor radially, disposed vents and a diaphragm displaceably covering the vents similar to those as shown in FIGS. 10–13.

FIG. 14 provides in the same figure, for purposes of comparison, sectional view showing both the closed or sealed position of diaphragm 464 over vents 496 (right hand side of figure) and the revealed or disengaged view whereby diaphragm 464 has been peeled away from vents 496 (left hand side of view) as described herein above with regard to the previous figures. The configuration of diaphragm 464 and vents 496 provide radial scaling of diaphragm 464 over radially oriented vents 496 paced around tube or shaft 447. Also, the configuration of housing 432, float 434 and valve assembly 442 promote minimizing the dimension 116 between a full tank fuel level and an inside surface of tank 14. This helps to minimize the volume of vapor space 22.

Ports 448 are provided in wall 406 of housing 432 to facilitate passage of fuel 24 into housing 432 thereby operating on float 434 to seal and unseal vents 496. Annular rim 118 is provided proximate to diaphragm 464 to facilitate controlled movement and retention of a desired convoluted shape of diaphragm 464 as it travels relative to the vents to seal and unseal vents 496. Absence of a rim 118 or other supporting structure against diaphragm 464 could cause the diaphragm to undesirably deform away from the vents 496.

Channel 414 is provided in an upper portion of housing 432 to define the tortuous path through which vapor must flow. As described above, this tortuous path helps to facilitate condensation of liquid fuel on surfaces of the tortuous path thereby removing it from the vapor flow and reducing the amount of liquid fuel which passes through vents 496.

As described herein and above, each of the embodiments provides a venting valve 10 having a valve assembly 42 which can be mounted internally of a fuel tank 14. Also, each of the embodiments helps to minimize the dimension between the full tank fuel level and an inside surface of the tank thereby further facilitating minimal vapor space 22 within tank 14. This provides "short shut off". In each of the embodiments, internal venting below the float helps to promote a smaller dimension between a top fuel level and a corresponding internal surface of the tank.

Each of the embodiments also provides a two step disengagement of the associated valve assembly from the corresponding surface of the housing. This two step disengagement or primary and secondary seal tends prevent corking and facilitates reopening of the valve against tank pressure which might otherwise tend to hold the valve assembly 42 in a closed condition.

Additionally, each of the embodiments includes structures which define a generally tortuous path and also shields the valve assembly to minimize the amount of liquid fuel which might otherwise enter the vapor path and corresponding vents or passages. In general, the tortuous vapor path promotes condensation of liquid vapor and draining of such vapor into the fuel tank 14.

While a preferred embodiment of the present disclosure is shown and described, it is envisioned that those skilled in the art may devise various modifications and equivalents without departing from the spirit and scope of the disclosure as recited in the following claims.

What is claimed is:

1. A vent valve for use in controlling discharge of fuel vapor from a fuel tank, comprising:
   a housing for attachment to a fuel tank;
   a wall of the housing defining a cavity,
   a float contained in the housing;
   the float being responsive to a level of liquid in the fuel tank;
   the housing having a passage therein communicating with an external portion of the tank;
   at least one vent positioned proximate to and communicating with the passage;
   a flexible diaphragm attached to at least the float;
   the diaphragm being a generally circular diaphragm, generally concentric with the passage in the housing;
   a generally annular outer edge of the diaphragm being attached to the float;
   an annular portion of the flexible diaphragm, spaced generally radially inwardly of the outer edge of the diaphragm being displaceably positioned least proximate to the passage to control the flow of vapor through the vent and through the passage;
   movement of the float toward the passage causing a portion of the flexible diaphragm to contact a surface of the housing at least proximate to the passage and the vent to prevent the flow of fuel vapor through the passage and vent; and
   movement of the float away from the passage causing the flexible diaphragm to move out of contract with the surface of the housing permitting passage of fuel vapor through the vent and passage.

2. A vent valve in claim 1, further comprising:
   an aperture extending through a portion of the diaphragm;
   the aperture communicating with the vents; and
   a protrusion carried on the float proximate to the aperture in the diaphragm for abutting and closing the aperture.

3. The vent valve in claim 2, further comprising:
   a flexible diaphragm having a first side, at least a portion of the first side displaceably abutting a surface of the housing;
   a second side of the diaphragm generally opposite the first side of the diaphragm, the second side generally facing at least a portion of the float;
   a bore extending through at least one of the diaphragm and float; and
   the bore communicating with the cavity of the housing and with a gap between the second side of the flexible diaphragm and the float.

4. The vent valve in claim 1, further comprising: the diaphragm being formed as a convoluted structure having a generally annular extending portions extending toward the passage;
   the extending portion being spaced generally radially form the passage for abutting a corresponding surface of the housing proximate the passage; and
   the extending portion providing an annular seal proximate to and spaced from the passage.

5. The vent valve in claim 1, further comprising:
   the at least one vent being formed in the portion of the housing proximate to the passage;
   the at least one vent formed in the housing communicating with the passage;
   the at least one vent formed in the housing communicating with the cavity of the housing when the diaphragm is displaced away from the vent;
   the diaphragm abutting the surface of the housing proximate to the passage and covering at least a portion of the vent when the float is moved toward the passage; and
   the diaphragm being progressively displaced away from abutment with the inside surface of the housing in response to displacement of the float away from the passage.

6. The vent valve of claim 5, further comprising:
   theat least one vent being positioned at least generally radially extending from the perimeter of the passage.

7. The vent valve of claim 5, further comprising:
   the at least one vent generally tapering along at least one dimension spaced from the passage.

8. The vent valve of claim 1, further comprising:
   a flexible diaphragm having a first side, a portion of the first side displaceably abutting the surface of the housing;
   a second side of the diaphragm which generally opposite the first side of the diaphragm, the second side generally facing at least a portion of the float;
   a bore extending through at least one of the diaphragm and float;
   the bore communicating with the cavity of the housing and with a gap between the second side of the flexible diaphragm and the float;
   a protrusion extending from first side of the diaphragm for engagement in the passage; and
   engagement of the protrusion in the passage restricting flow of fuel vapor through the passage.

9. The vent valve of claim 8, further comprising:
   at least one vent defined in the portion of the housing proximate to the passage;
   the vents communicating with the passage;

the vents communicating with the cavity of the housing when the diaphragm is at least partially displaced firm the vents; and wherein the protrusion engages the passage when the float is positioned towards the passage, engagement of the protrusion in the passage restricting flow of fuel vapor through the passage, the flexible diaphragm covering an end of the at least one vent when the float is positioned towards the passage, covering of the vents by the diaphragm preventing passage of vapor through the vent to the passage, displacement of the diaphragm from the vent permitting initial venting of fuel vapors through the vent to the passage.

10. The vent valve of claim 9, further comprising:

a guide protrusion extending from the second side of the diaphragm;

a guide recess defined in the float generally opposite the guide protrusion for receiving the guide protrusion therein; and engagement of the guide protrusion in the guide recess providing guidance and alignment of movement of the diaphragm relative to the passage and housing.

11. The vent valve of claim 1, further comprising:

a generally tubular wall defining the passage;

the at least one vent being defined in the wall providing communication between the cavity of the housing and the passage;

the flexible diaphragm being positioned generally against an outside surface of the wall; and the flexible diaphragm being displaceably positioned over the vent.

12. The vent valve in claim 11, further comprising:

the flexible diaphragm being positioned and retained between the float and an outside surface of the wall;

movement of the float on an increasing level of fuel in the tank causing the flexible diaphragm attached to the float and the outside surface of the wall to displaceably cover the vents; and movement of the float on a decreasing level of fuel in the tank causing the flexible diaphragm to displaceably uncover the vent.

13. The vent valve of claim 11, further comprising:

at least one channel provided between a portion of the housing and the float providing a tortuous path through which fuel vapor must travel, the tortuous path providing surfaces to facilitate condensation of liquid carried in the fuel vapor, draining of the condensate into the fuel tank.

14. A vent valve for use in controlling discharge of fuel vapor from a fuel tank, comprising:

a housing for attachment to a fuel tank;

a wall of the housing defining a cavity;

a float contained in the housing;

the float being responsive to a level of liquid in the fuel tank;

the housing having a passage therein communicating with an external portion of the tank;

at least one vent positioned proximate to and communicating with the passage;

a flexible diaphragm attached to at least the float;

the diaphragm being a generally circular diaphragm, generally concentric with the passage in the housing;

a generally annular outer edge of the diaphragm being attached to the float;

an annular portion of the flexible diaphragm, spaced generally radially inwardly of the outer edge of the diaphragm being displaceably positioned least proximate to the passage to control the flow of vapor through the vent and through the passage;

movement of the float toward the passage causing a portion of the flexible diaphragm to contact a surface of the housing at least proximate to the passage and the vent to prevent the flow of fuel vapor through the passage and vent; a movement of the float away from the passage causing the flexible diaphragm to move out of contact with the surface of the housing permitting passage of fuel vapor through the vent and passage;

a generally tubular wall defining the passage;

the at least one vent being defined in the wall providing communication between the cavity of the housing and the passage;

the flexible diaphragm being positioned generally against an outside surface of the wall;

the flexible diaphragm being displaceably positioned over the vent;

the flexible diaphragm being positioned and retained between the float and an outside surface of the wall movement of the float on an increasing level of fuel in the tank causing the flexible diaphragm attached to the float and the outside surface of the wall to displaceably cover the vents;

movement of the float on a decreasing level of fuel in the tank causing the flexible diaphragm to displaceably uncover the vent;

a second flexible diaphragm retained between the float and the outside surface of the wall; and the second diaphragm being spaced from the first diaphragm and the vent.

15. A vent valve for use in controlling discharge of fuel vapor from a fuel tack, comprising:

a housing for attachment to a fuel tank;

a wall of the housing defining a cavity;

a float contained in the housing;

the float being responsive to a level of liquid in the fuel tank;

the housing having a passage therein communicating with an external portion of the tank;

at least one vent positioned proximate to and communicating with the passage;

a flexible diaphragm attached to at least the float;

the diaphragm being a generally circular diaphragm, generally concentric with the passage in the housing;

a generally annular outer edge of the diaphragm being attached to the float;

an annular portion of the flexible diaphragm, spaced generally radially inwardly of the outer edge of the diaphragm being displaceably positioned least proximate to the passage to control the flow of vapor through the vent and through the passage;

movement of the float toward the passage causing a portion of the flexible diaphragm to contact a surface of the housing at least proximate to the passage and the vent to prevent the flow of fuel vapor through the passage and vent; a movement of the float away from the passage causing the flexible diaphragm to move out of contact with the surface of the housing permitting passage of fuel vapor through the vent and passage;

a generally tubular wall defining the passage;

the at least one vent being defined in the wall providing communication between the cavity of the housing and the passage;

the flexible diaphragm being positioned generally against an outside surface of the wall;

the flexible diaphragm being displaceably positioned over the vent;

the flexible diaphragm being positioned and retained between the float and an outside surface of the wall movement of the float on an increasing level of fuel in the tank causing the flexible diaphragm attached to the float and the outside surface of the wall to displaceably cover the vents;

movement of the float on a decreasing level of fuel in the tank causing the flexible diaphragm to displaceably uncover the vent; and a second diaphragm positioned between and attached to an outside surface of the float and a corresponding inside surface of the housing.

16. A vent valve for use in controlling discharge of fuel vapor from a fuel tank, comprising:

a housing for attachment to a fuel tank;

a wall of the housing defining a cavity;

a float contained in the housing;

the float being responsive to a level of liquid in the fuel tank;

the housing having a passage therein communicating with an external portion of the tank;

at least one vent positioned proximate to and communicating with the passage;

a flexible diaphragm attached to at least the float;

the diaphragm being a generally circular diaphragm, generally concentric with the passage in the housing;

a generally annular outer edge of the diaphragm being attached to the float;

an annular portion of the flexible diaphragm spaced generally radially inwardly of the outer edge of the diaphragm being displaceably positioned least proximate to the passage to control the flow of vapor through the vent and through the passage;

movement of the float toward the passage causing a portion of the flexible diaphragm to contact a surface of the housing at least proximate to the passage and the vent to prevent the flow of fuel vapor through the passage and vent; a movement of the float away from the passage causing the flexible diaphragm to move out of contact with the surface of the housing permitting passage of fuel vapor through the vent and passage;

a generally tubular wall defining the passage;

the at least one vent being defined in the wail providing communcation between the cavity of the housing and the passage;

the flexible diaphragm being positioned generally against an outside surface of the wall;

the flexible diaphragm being displaceably positioned over the vent;

the flexible diaphragm being positioned and retained between the float and an outside surface of the wall movement of the float on an increasing level of fuel in the tank causing the flexible diaphragm attached to the float and the outside surface of the wall to displaceably cover the vents;

movement of the float on a decreasing level of fuel in the tank causing the flexible diaphragm to displaceably uncover the vent;

the flexible diaphragm being retained on an upper portion of the float and attaching to an outside surface of the wall defining the passage; and a rim attached to the float proximate to the diaphragm the rim being spaced from the outside surface of the wall with the diaphragm extending between the rim and the wall, the rim facilitating controlled movement and retention of the convoluted shape of the diaphragm as it travels relative to the at least one vent.

17. A vent valve for use in controlling passage of fuel vapor in a fuel tank, comprising:

a housing for attachment to a fuel tank;

a wall of the housing defining a cavity;

a float contained in the housing;

the float being responsive to a level of liquid in the fuel tank;

the housing having a passage therein communicating with an internal portion of the tank for returning fuel vapor and liquid fuel to the tank;

a portion of the housing having at least one vent therein, the vent being positioned proximate to and communicating with the passage;

a flexible diaphragm attached to at least the float;

the diaphragm being a generally circular diaphragm, generally concentric with the passage in the housing;

a generally annular outer edge of the diaphragm being attached to the float;

an annular portion of the flexible diaphragm, spaced generally radially inwardly of the outer edge of the diaphragm being displaceably positioned least proximate to the passage to control the flow of vapor through the vent and through the passage;

movement of the float on a rising liquid level causing a portion of the flexible diaphragm to contact a sealing surface at least proximate to the vent to prevent the flow of fuel vapor through the vent; and movement of the float on a lowering liquid level causing the flexible diaphragm to move out of contract with the surface permitting passage of fuel vapor through the vent.

18. The vent valve of claim 17, further comprising:

a generally tubular wall defining the passage;

the at least one vent being defined in the wall providing communication between the cavity of the housing and the passage;

the flexible diaphragm being positioned generally against an outside surface of the wall; and the flexible diaphragm being displaceably positioned over the vent.

19. A vent valve for use in controlling discharge of fuel vapor from a fuel tank, comprising:

a housing for attachment to a fuel tank;

a wall of the housing defining a cavity;

a float contained in the housing;

the float being responsive to a level of liquid in the fuel tank;

the housing having a passage therein communicating with an external portion of the tank;

a vent assembly having a primary sealing structure and a secondary sealing structure;

the vent assembly having at least one vent therein, the vent being positioned proximate to and communicating with the passage;

the primary sealing structure providing at least partial sealing of the passage;

the secondary sealing structure providing additional sealing of the passage to prevent flow of vapors therethrough;

the secondary sealing structure being attached to at least the float;

the secondary sealing structure being a generally circular diaphragm, generally concentric with the passage in the housing;

a generally annular outer edge of the diaphragm being attached to the float;

an annular portion of the flexible diaphragm, spaced generally radially inwardly of the outer edge of the diaphragm being displaceably positioned least proximate to the passage to control the flow of vapor through the vent and through the passage;

movement of the float toward the passage causing a portion of the flexible diaphragm to contact a surface of the housing at least proximate to the passage and the vent to prevent the flow of fuel vapor through the passage and vent; and movement of the float away from the passage causing the flexible diaphragm to move out of contract with the surface of the housing permitting passage of fuel vapor through the vent and passage.

20. A tank vent apparatus comprising a valve housing formed to include an inlet port an outlet port, and an interior region arranged to receive fuel vapor admitted into the valve housing through the inlet port and to communicate fuel vapor to the outlet port for discharge from the valve housing, a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, and a vent port valve formed to include a central aperture receiving the upright interior wall therein and mounted for movement in the upstream passageway relative to the upright interior wall in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port.

21. The apparatus of claim 20, wherein the vent port valve includes a float positioned to lie in the upstream passageway and a seal coupled to the float to move therewith in the upstream passageway relative to the valve seat to close the at least one vent port upon movement of the vent port valve to the closed position and to open the at least one vent port upon movement of the vent port valve to the opened position.

22. A tank vent apparatus comprising a valve housing formed to include an inlet port, an outlet port, and an interior region arranged to receive fuel vapor admitted into the valve housing through the inlet port and to communicate fuel vapor to the outlet port for discharge from the valve housing, a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, and a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port wherein the vent port valve includes a float positioned to lie in the upstream passageway and a seal coupled to the float to move therewith in the upstream passageway relative to the valve seat to close the at least one vent port upon movement of the vent port valve to the closed position and to open the at least one vent port upon movement of the vent port valve to the opened position, the upright interior wall is cylinder-shaped and formed to include the discharge chamber therein, and the seal includes a base coupled to the float, a lip coupled to the upright interior wall, and a pliable annular membrane arranged to interconnect the base and the lip and configured to surround the upright interior wall and to roll back and forth relative to the valve seat and the at least one vent port formed therein as the float is raised and lowered in a rising and falling pool of liquid fuel extant in the upstream passageway to close the at least one vent port upon movement of the vent port valve to the closed position and to open the at least one vent port upon movement of the vent port valve to the opened position.

23. The apparatus of claim 22, further comprising an interior sleeve located in the interior region of the valve housing to surround the upright interior wall and to divide the upstream passageway into an intake chamber arranged to receive liquid fuel and fuel vapor admitted into the interior region through the inlet port and a float chamber containing the float and the seal therein, and wherein the interior sleeve is formed to include at least one lower fuel port configured to provide means for conducting liquid fuel from the intake chamber into a lower region of the float chamber whenever liquid fuel is admitted into the interior region of the valve housing through the inlet port to provide the rising and falling pool of liquid fuel for raising and lowering the float in the float chamber, and the interior sleeve is also formed to include at least one upper vapor port configured to provide means for conducting pressurized fuel vapor from the intake chamber into an upper region of the float chamber whenever pressurized fuel vapor is admitted into the interior region of the valve housing through the inlet port so that such pressurized fuel vapor passes through the at least one vent port into the discharge chamber whenever the vent port valve is moved in the float chamber to assume the opened position.

24. The vent apparatus of claim 22, wherein the valve housing includes a top wall adapted to be mounted to a top wall of a fuel tank, a bottom wall positioned to lie below and in spaced-apart relation to the top wall, and an outer side wall arranged to extend from the top wall to the bottom wall to define the interior region therebetween, the outer side wall is formed to include the inlet port and the bottom wall is formed to include the outlet port.

25. The apparatus of claim 22, wherein the valve housing includes a top wall adapted to be mounted to a top wall of a fuel tank, a bottom wall positioned to lie below and in spaced-apart relation to the top wall, and an outer side wall arranged to extend from the top wall to the bottom wall to define the interior region therebetween, the bottom wall is formed to include the outlet port, the upright interior wall is coupled to the bottom wall and arranged to extend upwardly toward the top wall, the float is ring-shaped and arranged to surround a lower portion of the upright interior wall and lie adjacent to the bottom wall, and the pliable annul membrane is arranged to surround an upper portion of the upright interior wall that is located between the lower portion of the upright interior wall and the top wall of the valve housing and is formed to include the at least one vent port.

26. A tank vent apparatus comprising
a valve housing formed to include an inlet port, an outlet port, and an interior region arranged to receive fuel vapor admitted into the valve housing through the inlet port and to communicate fuel vapor to the outlet port for discharge from the valve housing,
a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, and
a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, wherein the vent port valve includes a float positioned to lie in the upstream passageway and a seal coupled to the float to move therewith in the upstream passageway relative to the valve seat to close the at least one vent port upon movement of the vent port valve to the closed position and to open the at least one vent port upon movement of the vent port valve to the opened position, the upright interior wall is cylinder-shaped to define the discharge chamber therein, and the float is ring-shaped and formed to include a central aperture receiving the upright interior wall therein to allow movement of the float relative to the upright interior wall.

27. The apparatus of claim 26, wherein the upright interior wall is formed to include the outlet port at a lower end thereof conduct fuel vapor from the at least one vent port to the outlet port through the discharge chamber defined by the upright interior wall.

28. The apparatus of claim 26, wherein the valve housing includes a top wall adapted to be mounted to a top wall of a fuel tank, a bottom wall positioned to lie below and in spaced-apart relation to the top wall, and an outer side wall arranged to extend from the top wall to the bottom wall to define the interior region therebetween, the outer side wall is formed to include the inlet port, and the bottom wall is formed to include the outlet port and to place the outlet port in communication with the discharge chamber defined by the upright interior wall to cause fuel vapor passing from the upstream passageway into the discharge chamber through the at least one vent port when the vent port valve is moved to assume the opened position to be discharged from the interior region of the valve housing through the outlet port formed in the bottom wall.

29. A tank vent apparatus comprising
a valve housing formed to include an inlet port, an outlet port, and an interior region arranged to receive fuel vapor admitted into the valve housing through the inlet port and to communicate fuel vapor to the outlet port for discharge from the valve housing,
a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber
a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, wherein the vent port valve includes a float positioned to lie in the upstream passageway and a seal coupled to the float to move therewith in the upstream passageway relative to the valve seat to close the at least one vent port upon movement of the vent port valve to the closed position and to open the at least one vent port upon movement of the vent port valve to the opened position, and
an interior sleeve located in the interior region of the valve housing to surround the upright interior wall and to divide the upstream passageway into an intake chamber arranged to receive liquid fuel and fuel vapor admitted into the interior region through the inlet port and a float chamber containing the float and the seal therein, wherein the interior sleeve is formed to include at least one lower fuel port configured to provide means for conducting liquid fuel from the intake chamber into a lower region of the float chamber whenever liquid fuel is admitted into the interior region of the valve housing through the inlet port to provide the rising and falling pool of liquid fuel for raising and lowering the float in the float chamber, and wherein the interior sleeve is also formed to include at least one upper vapor port configured to provide means for conducting pressurized fuel vapor from the intake chamber into an upper region of the float chamber whenever pressurized fuel vapor is admitted into the interior region of the valve housing through the inlet port so that such pressurized fuel vapor passes through the at least one vent port into the discharge chamber whenever the vent port valve is moved in the float chamber to assume the opened position.

30. The apparatus of claim 29, wherein the valve housing includes a top wall arranged to intersect the central vertical axis of the valve housing and adapted to be mounted to a top wall of a fuel tank, a bottom wall arranged to intersect the central vertical axis of the valve housing and positioned to lie below and in spaced-apart relation to the top wall, and an outer side wall arranged to extend from the top wall to the bottom wall to define the interior region therebetween, the outer side wall is formed to include the inlet port, and the bottom wall is formed to include the outlet ports.

31. A tank vent apparats comprising
a valve housing formed to include an inlet port, an outlet port, and an interior region arranged to receive fuel vapor admitted into the valve housing through the inlet port and to communicate fuel vapor to the out let port for discharge from the valve housing,
a partition located in the valve housing to divide the interior region into an upstream passageway arranged to receive liquid fuel and fuel vapor admitted into the interior region through the inlet port and a discharge chamber arranged to discharge fuel vapor from the interior region through the outlet port, the partition including an upright interior wall providing a valve seat located in the upstream passageway and formed to include at least one vent port configured to communicate fuel vapor from the upstream passageway into the discharge chamber, and
a vent port valve mounted for movement in the upstream passageway in an axially upward direction to a closed position engaging the valve seat and closing the at least one vent port and in an axially downward direction to an opened position disengaging at least a portion of the valve seat and opening the vent port to allow fuel vapor to flow in a radial direction through the vent port from the upstream passageway into the discharge chamber to be discharged from the interior region through the outlet port, wherein the valve housing has a central vertical axis, the upright interior wall is cylinder-shaped and has a central vertical axis that is coextensive with the central vertical axis of the valve housing, and the upright interior wall is formed to include the discharge chamber therein.

32. The apparatus of claim 31, wherein the valve housing includes a top wall arranged to intersect the central vertical axis of the valve housing and adapted to be mounted to a top wall of a fuel tank, a bottom wall positioned to lie below and in spaced-apart relation to the top wall, an outer side wall arranged to extend from the top wall to the bottom wall to define the interior region therebetween, and the bottom wall is formed to include the outlet port at a lower end of the upright interior wall to cause fuel vapor in the discharge chamber to flow out of the interior region of the valve housing through the outlet port.

33. A tank vent apparatus comprising
a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing, the valve housing further including a partition arranged in the interior region to extend from the bottom wall to the top wall and formed to include a vent port configured to communicate fuel vapor admitted into the interior region through the inlet port to the outlet port, and
flow-control means located in the interior region of the valve housing for closing the vent port formed in the partition to block flow of liquid fuel admitted into the interior region through the inlet port from the interior region through the outlet port and opening the vent port formed in the partition to allow flow of pressurized fuel vapor admitted into the interior region to flow from the interior region through the outlet port until liquid fuel extant in the interior region rises above the bottom wall to a level in excess of a predetermined level.

34. A tank vent apparatus comprising
a valve housing including a top wall adapted to be mounted to a top wall of a fuel tank, a bottom wall positioned to lie in spaced-apart relation to the top wall, and an outer side wall arranged to cooperate with the top and bottom walls to define an interior region, the outer side wall being formed to include an inlet port to communicate liquid fuel and fuel vapor into the interior region, the bottom wall being formed to include an outlet port to discharge fuel vapor from the interior region to a destination outside of the valve housing, and
flow-control means located in the interior region of the valve housing for blocking flow of liquid fuel admitted into the interior region through the inlet port from the interior region through the outlet port and allowing flow of pressurized fuel vapor admitted into the interior region to flow from the interior region through the outlet port until liquid fuel extant in the interior region rises above the bottom wall to a level in excess of a predetermined level, wherein the flow control means includes a cylinder-shaped interior wall coupled to the bottom wall at the outlet port and formed to define a discharge chamber to conduct fuel vapor to the outlet port and at least one vent port configured to admit pressurized fuel vapor into the discharge chamber, an annular float formed to include a central aperture receiving the cylinder-shaped interior wall therein and positioned to lie in the interior region of the valve housing for movement along the cylinder shaped shaped interior wall and between the top and bottom walls of the valve housing, and a seal including a base coupled to the float, a lip coupled to the cylinder-shaped interior wall at a location between the at least one vent port and the bottom wall, and a pliable annular membrane arranged to interconnect the base and the lip and configured to surround a portion of the cylinder shaped shaped interior wall and to roll back and forth relative to the portion of the cylinder-shaped interior wall and the at least one vent port formed therein as the float is raised and lowered in a rising and falling pool of liquid fuel extant in the interior region outside of the discharge chamber to close the at least one vent port.

* * * * *